United States Patent
Schwartz et al.

(10) Patent No.: US 8,273,152 B2
(45) Date of Patent: Sep. 25, 2012

(54) SEPARATION METHOD AND APPARATUS

(75) Inventors: Joseph Michael Schwartz, Williamsville, NY (US); Raymond Francis Drnevich, Clarence Center, NY (US); Jerome Thomas Jankowiak, Williamsville, NY (US); Dante Patrick Bonaquist, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 477 days.

(21) Appl. No.: 12/615,509

(22) Filed: Nov. 10, 2009

(65) Prior Publication Data

US 2010/0122552 A1 May 20, 2010

Related U.S. Application Data

(63) Continuation-in-part of application No. 12/270,890, filed on Nov. 14, 2008, now abandoned.

(51) Int. Cl.
 *B01D 53/22* (2006.01)
 *F25J 3/00* (2006.01)
(52) U.S. Cl. ............. 95/55; 95/39; 95/45; 96/4; 62/617
(58) Field of Classification Search ............... 95/39, 45, 95/55, 56, 288; 96/4; 62/617
 See application file for complete search history.

(56) References Cited

U.S. PATENT DOCUMENTS

| | | | |
|---|---|---|---|
| 5,034,025 A | 7/1991 | Overmann, III | |
| 5,430,224 A | 7/1995 | Schucker | |
| 5,464,540 A | 11/1995 | Friesen et al. | |
| 5,611,842 A | 3/1997 | Friesen et al. | |
| 5,652,020 A | 7/1997 | Collins et al. | |
| 5,681,433 A * | 10/1997 | Friesen et al. | 95/52 |
| 5,935,298 A * | 8/1999 | Prasad et al. | 95/54 |
| 5,954,859 A | 9/1999 | Keskar et al. | |
| 6,037,514 A | 3/2000 | White et al. | |
| 6,066,307 A | 5/2000 | Keskar et al. | |

(Continued)

FOREIGN PATENT DOCUMENTS

EP 0 570 185 A2 * 11/1993

(Continued)

OTHER PUBLICATIONS

Collodi, G., et al., "The Sarlux IGCC Project an Outline of the Construction and Commissioning Activities"—1999 Gasification Technologies Conference, San Francisco, CA.

*Primary Examiner* — Jason M Greene
(74) *Attorney, Agent, or Firm* — David M. Rosenblum

(57) ABSTRACT

A separation method and apparatus that separates a component from a feed stream by use of a membrane in which separation is driven, at least in part, by a sweep stream. The sweep stream may be pumped to a supercritical pressure and then heated to at least near supercritical temperature, at least in part, through heat exchange with a component laden sweep stream being discharged from the membrane. A multi-component mixture can also be used that will produce the sweep stream as a vapor as a result of the heat exchange. The component laden sweep stream, due to cooling through the indirect heat exchange, will form a two-phase fluid that can be phase separated into a vapor phase enriched in the component that can be taken as a product and a residual liquid that can be recirculated in the formation of the sweep stream in the liquid state.

17 Claims, 5 Drawing Sheets

U.S. PATENT DOCUMENTS

| | | |
|---|---|---|
| 6,139,604 A | 10/2000 | Gottzmann et al. |
| 6,527,833 B1 | 3/2003 | Oyama et al. |
| 6,649,062 B1 | 11/2003 | Petty |
| 6,755,893 B2 | 6/2004 | Peinemann et al. |
| 6,783,750 B2 | 8/2004 | Shah et al. |
| 7,074,734 B2 | 7/2006 | Vu et al. |
| 7,964,020 B2 * | 6/2011 | Baker et al. .................. 96/4 |

FOREIGN PATENT DOCUMENTS

| | | |
|---|---|---|
| EP | 0570185 A2 | 11/1993 |
| EP | 0 701 857 A1 | 3/1996 |
| EP | 0700708 A1 | 3/1996 |
| EP | 0 916 384 A1 | 5/1999 |
| WO | WO 91/08040 A1 | 6/1991 |

* cited by examiner

SEPARATION METHOD AND APPARATUS

RELATED APPLICATIONS

This application is a continuation-in-part of U.S. patent application Ser. No. 12/270,890, filed Nov. 14, 2008, now abandoned.

TECHNICAL FIELD

The present invention relates to a method and apparatus for separating a component from a feed gas stream with the use of a membrane formed of a material capable of transporting the component at elevated operational temperature and under impetus of a positive partial pressure differential established at least in part with the use of a sweep gas stream. More particularly, the present invention relates to such a method and apparatus in which the sweep gas stream is composed of a single or multi-component fluid at or near a supercritical state or a multi-component fluid containing higher and lower boiling components.

BACKGROUND OF THE INVENTION

There exist a variety of membranes that are capable of separating a component from a feed gas stream when such membranes function at temperatures in excess of 250° F. Such membranes can function to transport the component to be separated from one side of the membrane, known as the retentate side, to the other side thereof, referred to as the permeate side. For example, in hydrogen separation, membranes, utilized to separate hydrogen, are formed of a thin layer of palladium or alloy of palladium on a porous supporting material. At elevated temperatures, when a feed stream containing hydrogen contacts the retentate side of the membrane, hydrogen atoms will diffuse through the palladium lattice to the opposite, permeate side, and emerge as pure hydrogen.

An example of a hydrogen transport membrane can be found in U.S. Pat. No. 5,652,020, which describes a hydrogen transport membrane comprised of a palladium layer deposited on a porous ceramic support layer. In addition to the foregoing, certain ceramic materials are capable of functioning as hydrogen transport membranes by conducting protons under the impetus of a partial pressure difference. Examples of such membranes can be found in U.S. Pat. Nos. 6,066,307 and 6,037,514. Porous membranes can also be used to selectively transport hydrogen based on molecular characteristics, such as size and shape. Examples of such membranes can be found in U.S. Pat. Nos. 6,527,833 and 7,074,734.

It is to be noted that in the use of hydrogen transport membranes, the hydrogen transport membrane can be combined with a process that is designed to produce the hydrogen containing stream from which the hydrogen is separated. For example, in U.S. Pat. No. 6,783,750, a reactor is disclosed in which oxygen produced by oxygen transport membranes is reacted with a hydrocarbon containing feed and steam to produce a synthesis gas from which the hydrogen is separated from the synthesis gas with the use of a hydrogen transport membrane. The permeate side of the hydrogen transport membrane is swept with steam to lower the partial pressure of the hydrogen on the permeate side and help drive the hydrogen separation across the membrane.

As indicated above, the separation of the component with the use of such membranes is driven by a partial pressure difference of the component on opposite sides of the membrane. This partial pressure difference can be established by compressing the feed stream containing the component and/or by introducing a sweep gas stream to the permeate side of the membrane to remove the separated component such as shown in U.S. Pat. No. 6,783,750. The use of a sweep gas stream has the advantage of decreasing the compression requirement for the feed gas stream and therefore the electrical power consumed in the separation process. Since it is only the partial pressure difference that is needed to drive the separation, the sweep gas stream can be introduced at pressure to allow the component to be delivered at such pressure after separation from the sweep gas material. Additionally, for a given separation, the membrane area can be reduced when a sweep gas stream is used. This is particularly advantageous with respect to palladium membranes given the expense of palladium.

While the sweep gas could be a compressed gas, it is more advantageous to use a liquid that has been pressurized by pumping and then vaporizing the liquid into a gas. One advantage is that, typically, pumps have much lower capital and operating costs compared to compressors. Moreover, when the component is to be separated from the component laden sweep gas stream, such stream can be condensed so that the component may be removed as a resulting vapor phase of the component laden sweep gas. The problem with this is that heat must be supplied to vaporize the pumped liquid that cannot be easily recovered. For example, steam has been used as a sweep gas stream in connection with palladium hydrogen transport membranes. However, once the hydrogen or other component that is separated has been added to the steam, the partial pressure of the steam drops, lowering its condensation temperature. Given that the vaporization and condensation temperature of steam at a given pressure is the same, for example, 100° C. at a partial pressure equal to atmospheric pressure, and that the vaporization and condensation temperature is a direct function of partial pressure of water vapor, transferring the latent heat of vaporization between the component laden steam and the makeup water is not possible. Steam will condense at a lower temperature than that required to vaporize the water. Therefore, when steam is used as the sweep stream, the sweep stream must be superheated to such an extent that there will be a large temperature difference in the heat exchanger. The problem is that the energy expended in heating the sweep stream in the case of steam is particularly high to maintain a temperature difference within a heat exchanger and further, the heat cannot be easily recovered. This is because although the degree of superheating of the steam may be sufficient to vaporize water, once a component is added to the steam, the condensation temperature will decrease and most of the steam will not condense in the heat exchanger. The subsequent condensation of the steam will result in what is in effect lost heat that is not recovered. Alternatively, if the sweep stream does not contain sufficient superheat to boil the water, a large portion of the steam might be condensed in the heat exchanger to heat the water to near its boiling point but additional high temperature heat will be required to boil the water. Significant energy losses will result from producing the high temperature heat needed to boil the water.

As will be discussed the present invention provides a method and apparatus in which a gas-impermeable membrane is swept using a sweep stream that is designed to allow heat energy to be recovered in a more efficient manner than the prior art discussed above.

SUMMARY OF THE INVENTION

The present invention provides a method of separating a component from a feed gas. In accordance with such method, a feed gas stream is introduced to a retentate side of a membrane and the component is separated from the feed gas stream such that the component collects at a permeate side of the membrane. This is accomplished by establishing a positive partial pressure difference of the component between the retentate side and the permeate side.

A sweep stream is circulated to the permeate side of the membrane to at least in part establish the positive partial pressure difference and thereby form a component laden sweep stream. The sweep stream is formed by pumping the sweep stream in a liquid state to a supercritical pressure and then heating the sweep stream to a temperature level of no less than 100° F. below a supercritical temperature. The sweep stream is heated, at least in part, through indirect heat exchange with the component laden sweep stream, thereby to cool the component laden sweep stream and to form a two-phase stream from the component laden sweep stream having the component in a vapor phase thereof. The two-phase stream is cooled such that a liquid phase of the two-phase stream is enriched in a substance making up the sweep stream and a vapor phase thereof is enriched in the component. The vapor phase is separated from the liquid phase to produce a component-rich stream containing the component and a residual liquid stream containing the substance. The residual liquid stream is recirculated as at least part of the makeup for the sweep stream in the liquid state.

In such embodiment, the sweep stream is being heated to form a fluid that is at or near a supercritical state or cooled from such state. Thus, the heat within the component laden sweep stream is being recovered in heating the sweep stream in the liquid state while forming vapor and liquid phases from the component laden sweep stream and as a result, less heat is lost from the process.

In another aspect of the present invention, the sweep stream is formed from a multi-component fluid composed of a mixture of at least one higher boiling component and at least one lower boiling component. The sweep stream in a vapor state is circulated to the permeate side of the membrane. The sweep stream in the vapor state is formed by heating the sweep stream in a liquid state. The sweep stream is heated, at least in part, through indirect heat exchange with the component laden sweep stream. As a result, the at least one higher boiling component contained in the component laden sweep stream is at least partially condensed and the two-phase stream is formed from the component laden sweep stream having the component in a vapor phase thereof. Further, the at least one lower boiling component in the sweep stream in the liquid state is at least partially vaporized. In this embodiment since the heat in the component laden sweep stream is being recovered in vaporizing the lower boiling component while condensing the higher boiling component, again, less heat is lost from the process. It is to be noted here that the at least one higher boiling component is said to be "at least partially condensed" and the at least one lower boiling component is said to be "at least partially vaporized" because the lower boiling component can also be present in the liquid phase. The extent of this is based on the relative volatility of the two components and other known considerations relating to hydrocarbon solubility.

In either aspect, the component can be hydrogen.

In a specific embodiment applicable to any aspect of the present invention, the component laden sweep stream indirectly exchanges heat to the sweep stream in the liquid state in a first heat exchanger and the sweep stream can be further heated in a second heat exchanger prior to being introduced to the permeate side of the membrane. The feed stream is also heated in a third heat exchanger, a fourth heat exchanger and a fifth heat exchanger prior to being introduced to the retentate side of the membrane. The two-phase stream is cooled by passing the two-phase stream in indirect heat exchange with the feed stream within the third heat exchanger and a water-cooled heat exchanger and the vapor phase is separated from the liquid phase by passing the two-phase stream from the water-cooled heat exchanger to a phase separator. A retentate stream, discharged from the retentate side of the membrane, is passed in indirect heat exchange with the feed stream in the fourth heat exchanger. A heated stream indirectly exchanges heat with the feed stream in the fifth heat exchanger and then indirectly exchanges heat with the sweep stream in the second heat exchanger.

In another embodiment, the component laden sweep stream indirectly exchanges heat to the sweep stream in the liquid state in a first heat exchanger and the sweep stream is further heated in a second heat exchanger prior to being introduced to the permeate side of the membrane. The feed stream is heated in a third heat exchanger, a fourth heat exchanger and a fifth heat exchanger prior to being introduced to the retentate side of the membrane. The two-phase stream is cooled by passing the two-phase stream in indirect heat exchange with the feed stream within the third heat exchanger and a water-cooled heat exchanger and the two-phase stream is separated by passing the two-phase stream into a first phase separator, located between the third heat exchanger and the water-cooled heat exchanger, to form a vapor stream and a liquid stream, passing the vapor stream to the water-cooled heat exchanger and then to a second phase separator such that a portion of the vapor stream is condensed in the water-cooled heat exchanger and the residual liquid stream and the component-rich stream are formed in the second phase separator. The liquid stream is recirculated and combined with the sweep stream in a liquid state to form another part of the makeup for the sweep stream in the liquid state.

The retentate stream is passed in indirect heat exchange with the feed stream in the fourth heat exchanger. A heated stream indirectly exchanges heat with the feed stream in the fifth heat exchanger and then indirectly exchanges heat with the sweep stream in the second heat exchanger.

In a specific embodiment of the present invention, applicable to either aspect thereof, a natural gas stream is compressed to form a compressed natural gas stream. An oxygen containing stream is compressed, preheated in a preheater and combined with a first subsidiary natural gas stream formed from part of the compressed natural gas stream that has been preheated, thereby forming a combined stream. The combined stream is introduced into a catalytic reactor to form a synthesis gas stream and the synthesis gas stream is introduced into a boiler to produce steam and part of the steam passes in indirect heat exchange with the oxygen containing stream after having been compressed to preheat the oxygen containing stream, another part of the steam is introduced into the synthesis gas stream and a further part of the steam is exported. Carbon monoxide and the steam within the synthesis gas stream are subjected to a water-gas shift reaction to react carbon monoxide and the steam and thereby to produce additional hydrogen in a shifted stream. In such embodiment, the shifted stream is the feed stream and a second subsidiary natural gas stream formed from another part of the compressed natural gas stream is combined with the retentate stream to form a fuel stream to a gas turbine.

In another embodiment of the present invention applicable to both aspects thereof, the synthesis gas after the addition of the steam forms the feed stream and the membrane is housed in a reactor containing a water-gas shift catalyst adjacent to or on the retentate side of the membrane, thereby to react the steam and carbon monoxide contained in the feed stream to produce additional hydrogen and carbon dioxide and a second subsidiary natural gas stream formed from another part of the compressed natural gas stream is combined with the retentate stream to form a fuel stream to a gas turbine.

In an embodiment of the present invention applicable to both aspects thereof, the component-rich stream is introduced into a separation unit to separate the component from the component-rich stream and thereby to produce a further purified component-rich stream, further enriched in the component and a recovered stream comprising the substance. The recovered stream is recirculated to a phase separator also used in separating the vapor phase from the liquid phase in the two-phase stream.

A yet still further aspect of the present invention concerns an apparatus for separating a component from a feed gas stream. In accordance with such further aspect, a membrane unit is provided that has at least one membrane configured to receive the feed stream on a retentate side and to separate the component from the feed gas stream such that the component collects at a permeate side of the membrane. This occurs when a positive partial pressure difference of the component is established between the retentate side and the permeate side. A flow network is configured to receive a residual liquid stream as at least part of the makeup for the sweep stream in a liquid state and to circulate a sweep stream to the permeate side of the membrane, thereby to at least in part establish the positive partial pressure difference and thereby form a component laden sweep stream.

A pump is positioned within the flow network such that the sweep stream in a liquid state is pumped to a supercritical pressure. Heat exchangers are positioned within the flow network and configured to indirectly exchange heat between the component laden sweep stream and the sweep stream in the liquid state, after having been pumped, such that the sweep stream is heated, at least in part, to a temperature of no less than 100° F. below a supercritical temperature and the component laden sweep stream is cooled. The cooling of the component laden sweep stream thereby forms a two-phase stream from the component laden sweep stream having the component in a vapor phase thereof. The heat exchangers also cool the two-phase stream such that a liquid phase of the two-phase stream is enriched in a substance making up the sweep stream and a vapor phase thereof is enriched in the component. At least one phase separator is positioned within the flow network to receive the two-phase stream after having been cooled, thereby to separate the vapor phase from the liquid phase and to produce a component-rich stream containing the component and the residual liquid stream.

In another aspect, the present invention provides an apparatus that is designed to utilize a sweep stream composed of a multi-component fluid formed of a mixture of at least one higher boiling component and at least one lower boiling component. In accordance with such aspect of the present invention, the pump is positioned within the flow network such that the sweep stream in a liquid state is pressurized. The heat exchangers are configured to indirectly exchange heat between the component laden sweep stream and the sweep stream in the liquid state, after having been pumped, such that the at least one lower boiling component contained in the sweep stream in the liquid state is at least partially vaporized and the at least one higher boiling component in the component laden sweep stream is at least partially condensed. In either of such aspects of the present invention, the component can be hydrogen.

The heat exchangers can include a first heat exchanger, a second heat exchanger, a third heat exchanger, a fourth heat exchanger, a fifth heat exchanger and a water-cooled heat exchanger. The first heat exchanger is in flow communication with the pump and the permeate side of the membrane such that the component laden sweep stream indirectly exchanges the heat to the sweep stream in a liquid state and thereby to form the two-phase stream. The second heat exchanger communicates between the first heat exchanger and the permeate side of the membrane and is connected to the fifth heat exchanger such that a heated stream passing through and discharged from the fifth heat exchanger further heats the sweep stream within the second heat exchanger. The third heat exchanger is configured to receive the feed stream. The third heat exchanger, the fourth heat exchanger and the fifth heat exchanger are serially connected such that the feed stream is successively heated in the third heat exchanger, the fourth heat exchanger and the fifth heat exchanger. The fifth heat exchanger is in flow communication with the retentate side of the membrane such that the feed stream after having been heated is introduced to the retentate side of the membrane. The third heat exchanger is connected to the first heat exchanger such that the two-phase stream is cooled by the feed stream. The fourth heat exchanger is in flow communication with the retentate side of the membrane such that a retentate stream discharged from the retentate side further heats the feed stream. The water-cooled heat exchanger is connected to the third heat exchanger so that the two-phase stream is further cooled within the water-cooled heat exchanger and the at least one phase separator is a single phase separator connected to the water-cooled heat exchanger to receive the two-phase stream.

In an alternative embodiment, the at least one phase separator is a first phase separator and a second phase separator. The second phase separator is connected to the water-cooled heat exchanger and the first phase separator is connected between the water-cooled heat exchanger and the third heat exchanger such that a vapor stream and a liquid stream are formed in the first phase separator. The vapor stream then passes to the water-cooled heat exchanger such that a portion of the vapor stream is condensed and the residual liquid stream and the component-rich stream are formed in the second phase separator. Another pump is connected to the first phase separator and between the first heat exchanger and the second heat exchanger such that the liquid phase stream combines with the sweep stream between the first heat exchanger and the second heat exchanger.

A first compressor can be provided to compress a natural gas stream and thereby form a compressed natural gas stream and a second compressor is provided to compress an oxygen containing stream. Preheaters are positioned to preheat the oxygen containing stream after having been compressed and a first subsidiary natural gas stream formed from part of the natural gas stream after having been compressed. A catalytic reactor is provided in flow communication with the preheaters such that a combined stream, composed of a first subsidiary natural gas stream and the oxygen containing stream, is introduced into a catalytic reactor to form a synthesis gas stream. A boiler is configured to receive the synthesis gas stream to heat boiler feed water and thereby to produce steam. The boiler is connected to the preheater such that part of the steam passes in indirect heat exchange with the oxygen containing stream after having been compressed to preheat the oxygen containing stream and a water-gas shift reactor is connected to the boiler such that another part of the steam is introduced into the synthesis gas stream and carbon monoxide within the synthesis gas stream and the steam are subjected to a water-gas shift reaction within the water-gas shift reactor to react carbon monoxide and the steam and thereby to produce a shifted stream containing additional hydrogen. An outlet discharges a further part of the steam from the boiler and the membrane unit is connected to the water-gas shift reactor such that the shifted stream is introduced to the retentate side of the membrane as the feed stream and is also in flow communication with the first compressor such that a second subsidiary natural gas stream formed from another part of the compressed natural gas stream combines with the retentate stream to form a fuel stream to gas turbine.

In yet another embodiment of the present invention, the boiler is connected to the preheaters such that part of the steam passes in indirect heat exchange with the oxygen containing stream after having been compressed to preheat the oxygen containing stream and the membrane unit is connected to the boiler so that another part of the steam and the synthesis gas stream combine and are introduced to the retentate side of the membrane as the feed stream. The membrane unit contains a water-gas shift catalyst adjacent to or on the retentate side of the membrane, thereby to react the steam and carbon monoxide contained in the synthesis gas stream to produce additional hydrogen. An outlet discharges a further part of the steam from the boiler and the membrane unit is also in flow communication with the first compressor such that a second subsidiary natural gas stream formed from another part of the compressed natural gas stream combines with the retentate stream to form a fuel stream to a gas turbine.

In any embodiment of the present invention, a separation unit may be connected to the at least one phase separator so as to receive the component-rich stream. The separation unit is configured to separate the component from the component-rich stream and thereby to produce a further purified component-rich stream, further enriched in the component and a recovered stream composed of the substance. The flow network is configured such that the recovered stream is recirculated to the single or the second phase separator mentioned above.

BRIEF DESCRIPTION OF THE DRAWINGS

While the specification concludes with claims distinctly pointing out the subject matter that Applicants' regard as their invention, it is believed that the invention will be better understood when taken in connection with the accompanying drawings in which:

DETAILED DESCRIPTION

Although the following discussion will center on embodiments of the present invention in which the separation and/or the production of hydrogen is the objective and as such, use palladium or palladium alloy membranes, the scope of the present invention is not necessarily so limited. In this regard, in some broad aspects, the present invention has application to a variety of industrial processes that include the separation of helium for production of the helium or for purification of feed streams in which a sweep stream is used to lower the partial pressure of the component to be separated on the permeate side of the membrane.

Figure 1:
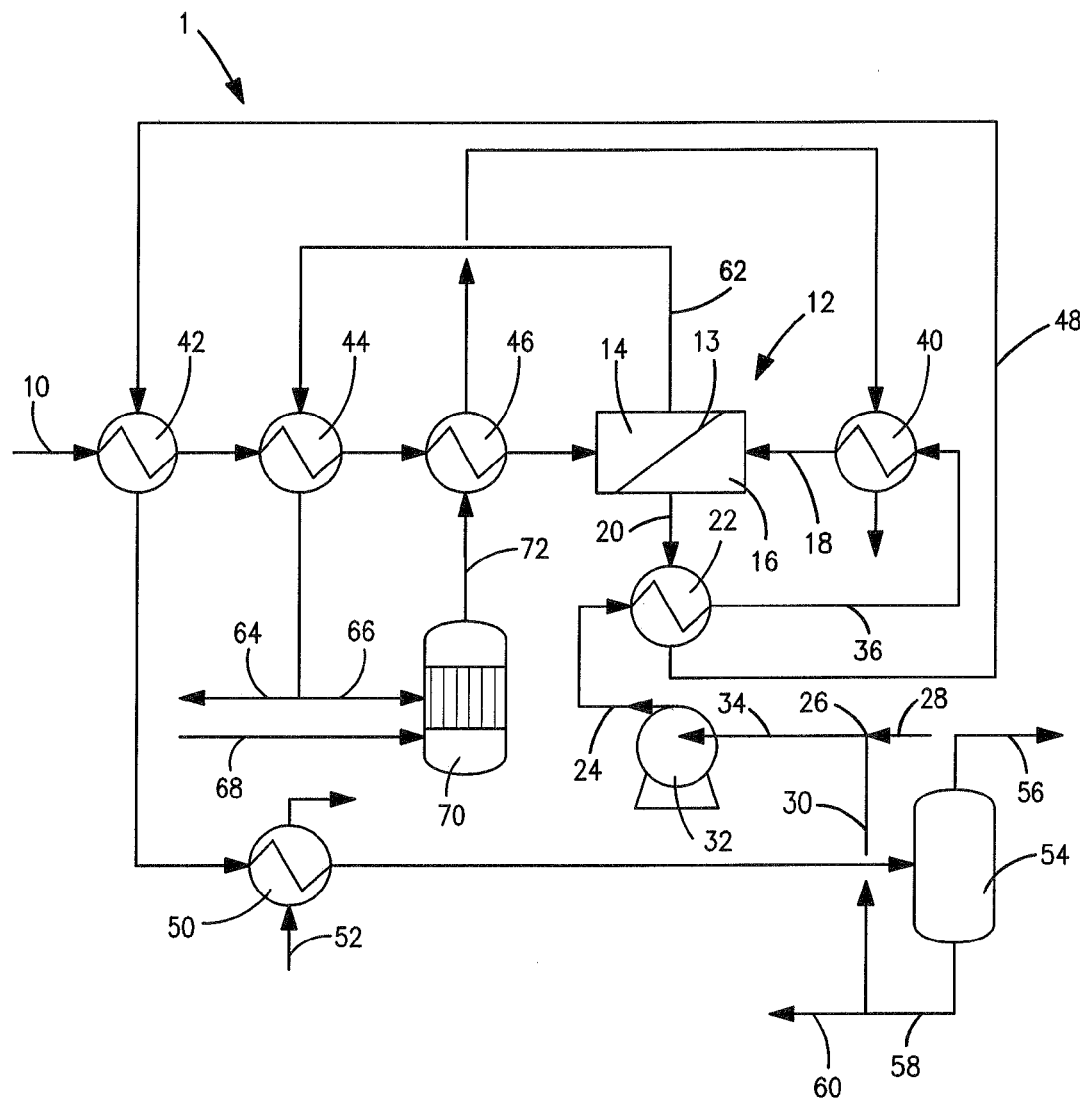
FIG. 1 is a schematic flow diagram of an apparatus for carrying out a method in accordance with the present invention.

With reference to FIG. 1, an apparatus 1 is illustrated that is designed to separate hydrogen from a feed gas stream 10 with the use of a membrane unit 12. Membrane unit 12 has one or more membranes 13 formed of palladium or an alloy of palladium. It is to be noted that niobium and tantalum have also been used for such purposes. As indicated above, the present invention, in at least its broadest aspects, is not so limited and consequently, apparatus 1 could be designed with a different type of membrane, for example, a porous membrane, such as a zeolite or porous ceramic, a proton-type membrane utilizing a perovskite to separate hydrogen or a porous membrane to separate helium from a feed. A porous membrane for hydrogen separation would have a lower hydrogen selectivity than a palladium membrane. A ceramic proton conductor would require the use of higher temperatures and would not provide known advantages over the illustrated palladium membrane. Thus, preferably, membrane 13 is a palladium alloy membrane of the type supported on a ceramic support such as discussed above.

In case of palladium and palladium alloy membranes, when such membrane or membranes are heated to an elevated operational temperature of typically between about 250° C. and about 600° C. and under impetus of a partial pressure difference, hydrogen will diffuse through lattice of the palladium from a retentate side 14 to a permeate side 16 of the membrane 13. As will be discussed in more detail hereinafter, this partial pressure difference is induced, at least in part, as a result of a sweep stream 18 that is circulated to the permeate side 16 of the membrane 13. The resulting component laden sweep stream 20 is subjected to indirect heat exchange in a first heat exchanger 22 with the sweep stream 18 in a liquid state that is designated as a liquid stream 24, that has either been pumped to supercritical pressure or is a multi-component mixture in which the lower boiling components thereof will at least partially vaporize within first heat exchanger 22. As to the component laden sweep stream 20, the heat exchange will result in part of the stream being a vapor enriched in the component to be separated, due to the cooling of component laden sweep stream 20 or the partial condensation of at least one of the higher boiling components in case of a multi-component fluid. As a result, thermal energy is able to be recovered while at the same time effectuating a partial separation of the component to be separated by the membrane unit. Thus, the heat energy that has been added to component laden sweep stream 20 can be recovered in the liquid stream 24 resulting in some liquid being produced in the component laden sweep stream 20 to effect a partial separation of the component from the component laden sweep stream 20.

In order to efficiently heat the feed stream 10, to recover thermal energy and to heat the liquid stream 24, a flow network is connected to the membrane unit 12 and is configured to circulate a sweep stream 18 to the permeate side 16 of the membrane unit 12 and thereby lower the partial pressure of the hydrogen on the permeate side 16 to drive the separation of the hydrogen through the membrane. The flow network has a pump for such purposes and heat exchangers to heat the sweep stream to at least within about 50° F. of the operational temperature of the membrane unit 12.

Specifically, the flow network is provided with an inlet 26 to receive a makeup stream 28 and a residual liquid stream 30. A pump 32 is in flow communication with inlet 26 such that a liquid stream 34 is formed from residual liquid stream 30 to be discussed and the makeup stream 28. First heat exchanger 22 is in flow communication with pump 32 and the permeate side 16 of the membrane unit 12 to heat the liquid stream 24 to form a partially heated sweep stream 36. A second heat exchanger 40 that is connected between the permeate side 16 of the membrane unit 12 and the first heat exchanger 22 to further heat the partially heated sweep stream 36 to form sweep stream 18. Here it is appropriate to point out that, as discussed above, sweep stream 18 can be a supercritical fluid. In such case, the pump 32, pumps the liquid stream 34 to a supercritical pressure. The partially heated sweep stream 36 upon leaving the first heat exchanger 22 could be a supercritical fluid or could be heated further in the second heat exchanger 40 such that the sweep stream 18 is in the supercritical state. Alternatively, the heating of the sweep stream 18 could be to a temperature that is near supercritical, namely, to a temperature of no less than 100° F. below the supercritical temperature. In case of the sweep stream 18 being formed from a multi-component mixture, typically the liquid stream 34 will be pumped to a high pressure, below the supercritical pressure so that the hydrogen product can be taken at the necessary pressure. However, for a multi-component fluid, the pressurization might be much less and as such pump 32 would serve as simply a circulation pump. However, in case of a multi-component mixture, the partially heated sweep stream 36 upon leaving the first heat exchanger 22 may contain one or more higher boiling components in the liquid state which may be vaporized in the second heat exchanger 40.

At the same time, a third heat exchanger 42, a fourth heat exchanger 44 and a fifth heat exchanger 46, connected in series, also heat the feed gas stream 10 prior to its introduction to the retentate side 14 of the membrane unit 12. The feed gas stream 10 as a result of being heated will also heat the membrane 13 to maintain it near the system operating temperature. Since sweep stream 18 has also been heated, it may also help to heat the membrane 13.

The liquid stream 24, in a manner to be discussed, after passage through first heat exchanger 22 will partially be in a vapor or in a supercritical state or a liquid if below the supercritical temperature through indirect heat exchange with a component laden sweep gas stream 20 passing through the first heat exchanger 22. Component laden sweep gas stream 20 is formed by passage of the sweep stream 18 passing through the permeate side 16 of the membrane unit 12. The heat exchange will also result in part of the component laden sweep stream 20 to also be in a liquid state through cooling. This creates a two-phase stream 48 with the component primarily in the vapor phase thereof while some component may be dissolved in the liquid phase thereof. The two-phase stream 48 passes through the third heat exchanger 42 where it partially cools and then is further cooled in a water-cooled heat exchanger 50 by a cooling water stream 52. The thus, cooled two-phase stream is then introduced into a phase separator 54 where the liquid and vapor phases separate to produce a component-rich stream 56 and a liquid phase stream 58 that may be separated into the residual liquid stream 30 and a waste stream 60. Component-rich stream 56 in the illustrated embodiment is a hydrogen product stream. As could be appreciated, the two-phase stream 48 could be introduced into a chiller positioned between the water-cooled heat exchanger 50 and the phase separator 54.

A retentate stream 62 formed by separation of the hydrogen within the membrane unit 12 is discharged from the retentate side 14 of the membrane 13 and into the fourth heat exchanger 44 to further heat the feed gas stream 10. Retentate stream 62 is divided into a recycle stream 64 and a fuel stream 66. Fuel stream 66 is fed along with an oxygen containing stream 68 to a catalytic burner 70 that produces a flue gas stream 72 that passes through the fifth heat exchanger 46 to indirectly exchange heat with the incoming feed gas stream 10 and thereafter passes through the second heat exchanger 40 to further heat the partially heated sweep stream 36.

It is to be noted here that retentate stream 62 could have more value than other potential fuels and as such, embodiments of the present invention are possible in which natural gas or other fuel is combusted in the catalytic burner 70 instead of retentate steam 62. Another alternative is to avoid combustion and use another source of heat. Although not shown, it is possible that this process is operating in a large facility that could provide heat for the sweep stream 18. In some cases, this heat could be provided using steam. For example, a membrane could operate at 450° F. Saturated steam at 550 psig has a temperature of 480° F. and could be used to provide heat to the membrane. Using steam to provide heat provides an advantage because it generally results in lower capital costs than using a burner. It should also be pointed out that some of the heat exchangers discussed above could be combined. In some cases, there is not enough heat recovered in a particular heat exchanger to justify its capital cost. In other cases, it is possible to combine heat exchangers, particularly around the membrane unit 12. For example, more heat could be provided to the feed stream in the fifth heat exchanger 46 to heat it beyond its typical feed temperature. The additional heat could be transferred across the membrane 13 to the sweep stream 18 to heat it to the membrane operating temperature. This could eliminate the need for the second heat exchanger 40, which would probably reduce the capital cost of the system without sacrificing performance or efficiency.

In one embodiment of the present invention, the pump 32 pressurizes the liquid stream 34, which is the sweep stream in a liquid state, to such an extent that the resulting liquid stream 24 constitutes the sweep stream at a supercritical pressure. Further heating of this stream in first heat exchanger 22 and second heat exchanger 40 raises the temperature of such stream to at least within 100° F. of the supercritical temperature and thereby forms the sweep stream 18 in a near supercritical state or in the supercritical state. When the component laden sweep stream 20 indirectly exchanges heat with the liquid stream 24, which is the sweep stream in the liquid state, the temperature will fall and as a result, part of the component laden sweep stream will be in a vapor state and part will be in a liquid state as the two-phase stream 48. Since in the near supercritical state or the supercritical state, there is little or no discrete latent heat that needs to be recovered in the first heat exchanger 22, the energy required for the phase change is spread out over a temperature range, so heat can be transferred from the component laden sweep stream 20 to the liquid stream 24 continuously. In some cases, stream 20 is a vapor in a near supercritical state because the partial pressure of the substance is reduced to below its critical pressure. In a near supercritical state, there is some discrete latent heat that needs to be recovered. Approaching the supercritical state reduces the discrete latent heat compared to operating conditions that are farther from the supercritical state; operating within 100° F. of the critical temperature results in latent heat that is smaller than it would be if the operating temperature were lower. Since the phase separator 54 is below the critical temperature, the liquid content of the two-phase stream 48 can be separated to allow recovery of the component-rich stream 56 which would be a hydrogen product stream at the required pressure. Recovery of hydrogen at high pressure is a particularly important economic advantage because it eliminates or reduces the cost of hydrogen compression compared to the cost for low pressure recovery.

A multi-component mixture of substances can also be used for the makeup stream 28. In such case, pump 32 pressurizes the liquid stream 24 to a level below the supercritical pressure and at least the lower boiling components within liquid stream 24 will vaporize within the first heat exchanger 22 and then, upon further heating within second heat exchanger 40, the sweep stream 18 will be entirely vaporized or superheated. The component laden sweep stream 20, upon passage through the first heat exchanger 22 will cool and as a result, a mixture containing predominantly the higher boiling components will at least partially condense to form two-phase stream 48. Although, when a multi-component mixture is used, high pressures are not required, practically high pressures below the supercritical pressure will be used to obtain the component-rich product stream 56 at required pressures for such stream. The main advantage of a multi-component substance is that the heat exchange efficiency is enhanced because there is not a single discreet phase transition temperature, but rather a phase transition temperature range because the particular components being higher and lower boiling components thereof will change state from vapor to liquid over a range of temperatures and not a single temperature as in the case of steam or another single component operating below its critical temperature. The disadvantage of the multi-component fluid is that invariably some of the sweep stream material will leave the system, either through leaks or through remaining as a vapor within component-rich stream 56.

Since the multi-component fluid contains substances that will have different volatilities, the lighter components will tend to leave in stream 56 at a higher rate than the heavier components. This means that the composition of the sweep stream 18 will change over time. In order to prevent this, a makeup stream 28 can be added. In the case of a multi-component fluid, this will require careful analysis and addition of several components to maintain the desired mixture composition. Alternatively, the composition of the liquid stream 24 can vary within an operating range such that it has sufficient lower boiling components to at least partially vaporize when heated in first heat exchanger 22 and the component laden sweep stream 20 has sufficient higher boiling components to at least partially condense when cooled in first heat exchanger 22. In the case of the supercritical or near supercritical embodiment, only the pressure will need to be monitored and if the stream is formed of a single component, only the single component will need to be added. No analysis or difficult monitoring is required and there is never a change in the composition other than possible decomposition of the purge material. When decomposition occurs, the resulting molecules will be lighter than the original material, so the decomposition products will most likely leave with the component-rich product stream 56. In most cases, the process can be designed so that the decomposition rate is slow enough that it does not cause a problem with product purity. Decomposition can also occur in the multi-component mixture embodiment; and this is likely to be a bigger problem than in a single component case. This is because a mixture is likely to include at least one hydrocarbon larger than the single component stream and decomposition rates increase as hydrocarbon size increases. Alternatively, an adsorbent or cooler can be added to the product outlet to remove any trace hydrocarbons in the product resulting from decomposition or volatility.

Example materials that can be used to recover hydrogen using palladium-alloy membranes are hydrocarbons between about $C_5H_{12}$ and $C_{12}H_{26}$. The material depends on the membrane operating temperature and pressure, as well as the chemical composition of the permeate. If a hydrocarbon is used, saturated hydrocarbons are preferred because the palladium membrane might act as a hydrogenation catalyst at elevated temperature and long exposure times. Other materials with critical temperatures between about 100° C. and 400° C. and critical pressures below about 40 bar can also be used provided that they do not react with hydrogen, have a low vapor pressure at the separator temperature, expected to be about 100-200° F., and are stable in a hydrogen environment. Material selection will be based on a tradeoff between lower volatilities of heavier materials and lower critical temperatures and decomposition rates of lighter materials.

The makeup for sweep stream 18 could be mixtures of the following substances: 1,2,3-trichoropropane, 2,4-dimethylpentane, 2-methyl-3-ethylpentane, trimethyl borate, 3,3-dimethylpentane, 3-methyl-3-ethylpentane, 1-chlorobutane, 3-ethylpentane, 2,2,3,3-tetramethylbutane, 2-chlorobutane, 2,2,3-trimethylbutane, 1-octanol, tert-butyl chloride, 1-heptanol, 2-octanol, 1-pentanol, 1,1-dimethylcyclohexane, 2-methyl-3-heptanol, 2-methyl-1-butanol, 1,2-dimethylcyclohexane, 4-methyl-3-heptanol, 3-methyl-1-butanol, 1,3-dimethylcyclohexane, 5-methyl-3-heptanol, 2-methyl-2-butanol, 1,4-dimethylcyclohexane, 2-ethyl-1-hexanol, 2,2-dimethyl-1-propanol, ethylcyclohexane, n-propylcyclohexane, perfluorocyclohexane, 1,1,2 trimethylcyclopentane, isopropylcyclohexane, perfluoro-n-hexane, 1,1,3-trimethylcyclopentane, n-nonane, perfluoro-2-methylpentane, 1,2,4-trimethylcyclopentane, 2-methyloctane, perfluoro-3-methylpentane, 1-methyl-ethylcyclopentane, 2,2-dimethylheptane, perfluoro-2,3-dimethylbutane, n-propylcyclopentane, 2,2,3-trimethylhexane, methylcyclopentane, isopropylcyclopentane, 2,2,4-trimethylhexane, n-hexane, cyclooctane, 2,2,5-trimethylhexane, 2-methyl pentane, n-octane, 3,3-diethylpentane, 3-methyl pentane, 2-methylheptane, 2,2,3,3-tetramethylpentane, 2,2-dimethyl butane, 3-methylheptane, 2,2,3,4-tetramethylpentane, 2,3-dimethyl butane, 4-methylheptane, 2,2,4,4-tetramethylpentane, perfluoromethylcyclohexane, 2,2-dimethylhexane, 2,3,3,4-tetramethylpentane, perfluoro-n-heptane, 2,3-dimethylhexane, 1-nonanol, cycloheptane, 2,4-dimethylhexane, Butylcyclohexane, 1,1-dimethylcyclopentane, 2,5-dimethylhexane, isobutylcyclohexane, 1,2-dimethylcyclopentane, 3,3-dimethylhexane, sec-butylcyclohexane, methylcyclohexane, 3,4-dimethylhexane, tert-butylcyclohexane, n-heptane, 3-ethylhexane, n-decane, 2-methylhexane, 2,2,3-trimethylpentane, 3,3,5-trimethylheptane, 3-methylhexane, 2,2,4-trimethylpentane, 2,2,3,3-tetramethylhexane, 2,2-dimethylpentane, 2,3,3-trimethylpentane, 2,2,5,5-tetramethylhexane, 2,3-dimethylpentane, or 2,3,4-trimethylpentane.

For example a makeup mixture for makeup stream 28 and therefore, the sweep stream 18 could be a mixture of octane and heptane, octane would be the highest boiling component and heptane would be the lowest boiling component. Another possibility would be a mixture of steam and an alcohol in the above listing. Some of the materials alone would be suitable for the makeup for the sweep stream when utilized at a supercritical pressure and near or above the supercritical temperature, for instance, octane. The sweep stream could be made up of more than two of such components as well.

The following Table 1 represents calculated examples of the operation of embodiment shown in FIG. 1 with steam, a multi-component mixture and a supercritical fluid.

TABLE 1

| Parameter | FIG. 1 (#) | Case 1 | Case 2 | Case 3 |
|---|---|---|---|---|
| Sweep Stream Makeup (Pc = critical pressure, Tc = critical temperature) | Stream 18 | Steam (Pc = 3209.0 psia, Tc = 374.1 C.) | $C_6$-$C_{10}$ Mix | Octane (Pc = 409.4 psia, Tc = 295.2 C.) |
| Sweep Stream Flow Rate (scfh) | Stream 18 | 387,833 | 425,833 | 422,916 |
| Heat Recovered from Permeate and Retentate (MMBtu/100,000 SCF $H_2$) | Heat Exchangers 42, 44, 22 | 5.52 | 18.82 | 18.87 |
| Hot End Utility* (MMBtu/100,000 SCF $H_2$) | Fifth and Second Heat Exchangers 46, 40 | 7.36 | 4.27 | 4.22 |
| Cold End Utility** (MMBtu/100,000 SCF $H_2$) | 50 | 6.62 | 6.59 | 6.61 |
| Cold End Loss (MMBtu/100,000 SCF $H_2$) | Retentate stream discharged from third heat exchanger 44 and flue gas stream discharged from second heat exchanger 40 | 4.31 | 2.74 | 2.72 |
| Fuel Consumed (MMBtu/100,000 SCF $H_2$) | Catalytic Combustion Unit 70 | 9.88 | 5.96 | 5.89 |
| Cold End Approach ΔT (° F.) | Heat Exchangers 42, 44, 46 | 305 | 175 | 176 |
| Retentate Exit Temp. (° F.) | Stream 64 | 419 | 289 | 290 |

*Hot End Utility = heat duties (flue gas stream 72: upon discharge from catalytic combustion unit 70 –> upon discharge from fifth heat exchanger 46 –> upon discharge from second heat exchanger 40)
**Cold End Utility = the cooling duty of two-phase stream 48 passing through water-cooled heat exchanger 50

It was assumed that the feed stream 10 had a temperature of 100° F., a pressure of 340 psig, a flow rate of 378,750 scfh, a hydrogen fraction of 63.3 percent, a hydrocarbon fraction of 37.4 percent, a nitrogen fraction of 0.3 percent, and a hydrogen partial pressure of 224.4 psi. Stream 56 had a hydrogen flow rate of 239,635 scfh and a pressure of 600 psia. Case 1 used steam as the purge material. Case 2 is the multi-component mixture embodiment and used an equimolar mixture of straight-chain alkanes ($C_6H_{14}$, $C_7H_{16}$, $C_8H_{18}$, $C_9H_{20}$, and $C_{10}H_{22}$) and Case 3 used supercritical octane.

One key component to the efficiency of the process is cold end approach ΔT, which is a direct measure of the heat recovered from the component laden sweep stream 20 and retentate stream 62. The reason for this is that the cold end approach ΔT within the first heat exchanger 22 is much larger for Case 1, the steam case, as compared to Cases 2 and 3. There is also a more pronounced hot end utility requirement for Case 1 than for Cases 2 and 3. Steam has a larger hot end utility requirement because of latent heat effects. The difference in efficiency can also be seen by looking at the retentate exit temperatures, which are related to the cold end loss. A higher exit temperature means that less heat was recovered in the process. As is evident, Case 1 was the least energy efficient of all of the processes.

When an expensive membrane is used, such as one made from palladium, it can be very important to minimize membrane area. One method to reduce membrane area is to increase the flow rate of the sweep stream 18. Table 2 (Cases 4-6) shows the effect of increasing the flow rate of sweep stream 18 while maintaining all other features constant that were discussed above with respect to Table 1. In all cases shown in Table 2, supercritical octane was used for sweep stream 18. Case 4 uses the same flow rate for sweep stream 18 as in Table 1. Once again, as in Table 1, the hydrogen product pressure was 600 psia.

TABLE 2

| Parameter | Case 4 | Case 5 | Case 6 |
|---|---|---|---|
| Total Purge Flow Rate (scfh) | 422,916 | 845,833 | 1,691,667 |
| Total Membrane Area Required (ft²) | 5472 | 1603 | 1121 |
| Fuel Consumed (MMBtu/100,000 SCF $H_2$) | 5.89 | 10.30 | 18.90 |

Increasing the flow rate of the sweep stream 18 can significantly reduce the required membrane area, and presumably, the capital cost of the membrane unit. However, increasing the flow rate also increases the amount of fuel consumed. Thus, the flow rate should be selected by balancing these competing factors.

Figure 2:
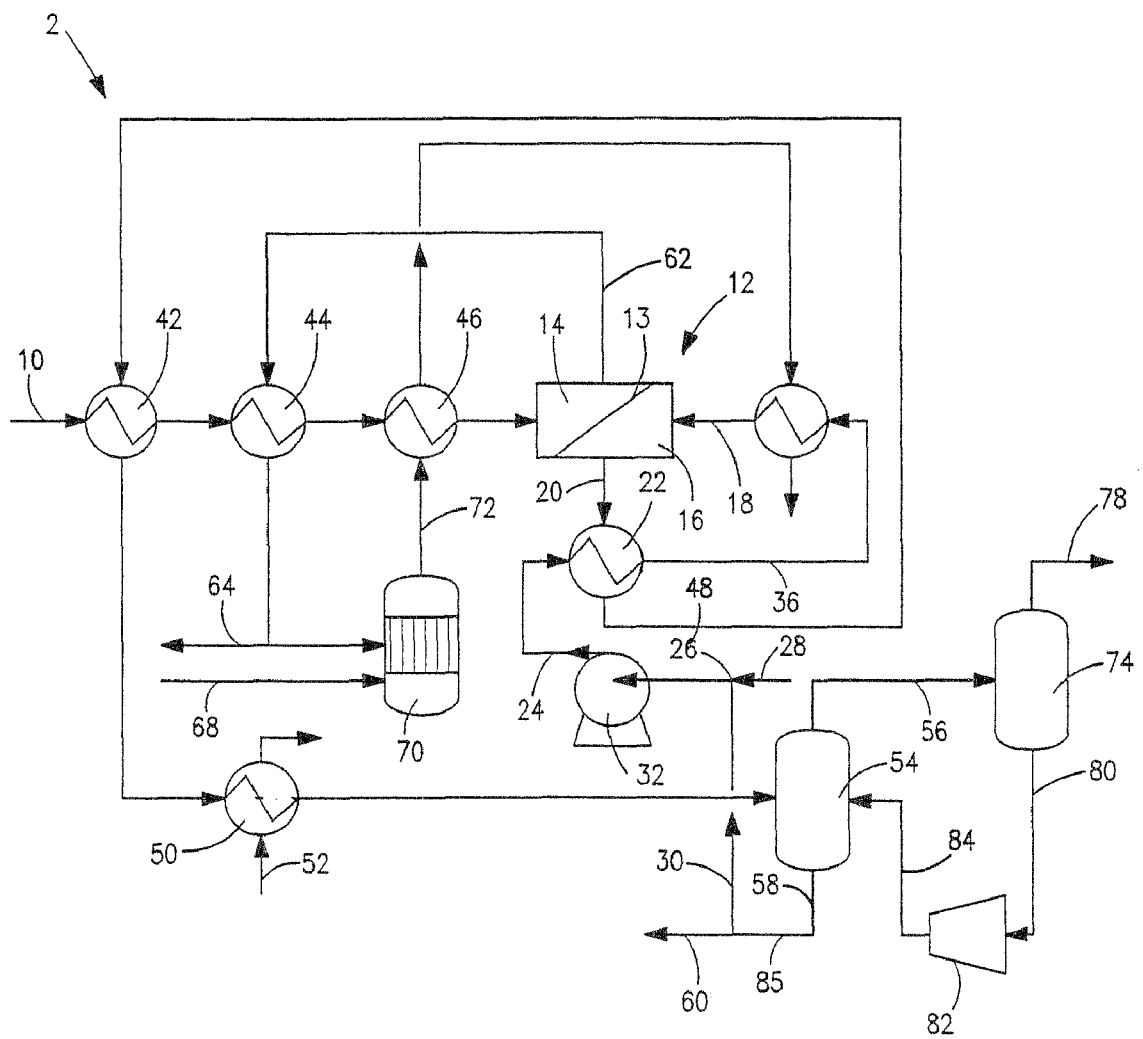
FIG. 2 is a schematic flow diagram of an alternative embodiment of FIG. 1.

With additional reference to FIG. 2, an alternative embodiment of FIG. 1 is illustrated as an apparatus 2 in which the component-rich stream 56 is introduced into a further separation unit 74 that can be a PSA unit or a chiller, such as a glycol unit, to produce a further purified component-rich stream 78 and also to recover part of the makeup for the sweep stream 18 that is being lost in the component-rich stream 56. As can be appreciated, some of the sweep stream makeup material will be in the separated vapor phase due to volatility. This is especially true for lighter hydrocarbon purge streams. This not only causes an economic penalty, due to the loss of purge material, but it also lowers the purity of the hydrogen product. In the case of an adsorption unit, such a PSA, the recovered sweep stream makeup material separated from the component-rich stream 56 as a stream 80 can be compressed in a recycle compressor 82 to produce a compressed stream 84 that is returned to a phase separator 54. Compressed stream 84 will contain both the component and the sweep stream makeup material. The component will leave the separator as part of the component-rich stream 56 while the sweep stream makeup material in compressed stream 84 will raise the partial pressure of the sweep stream makeup material in the phase separator 54, causing more of it to condense. Recirculating the compressed stream allows for nearly complete recovery of hydrogen in the PSA with hydrogen purity greater than 99.9 percent. A periodic blowdown could be used to remove inert gas that might build up over time and would result in minor loss of hydrogen product. In applications without compressed stream recirculation, nearly complete hydrogen recovery is not possible because the compressed stream contains hydrogen. Where a heavier substance is used in forming the sweep stream 18, then a single adsorbent bed could be used in place of separation unit 74 that could be periodically regenerated by heating such bed or passing a purge gas through it and discarding the substance discharged from such bed instead of recycling it back to apparatus 2. In the case of a chiller, stream 80 will be a liquid comprising the sweep stream makeup material and could contain component dissolved in it. In this case, compressor 82 would be replaced by a pump (not shown) to recirculate the stream to the phase separator 54. Apparatus 2 otherwise functions in the same manner as apparatus 1 and for such purposes, the same reference numbers have been used with respect to elements thereof that have been described above with respect to apparatus 1.

Figure 3:
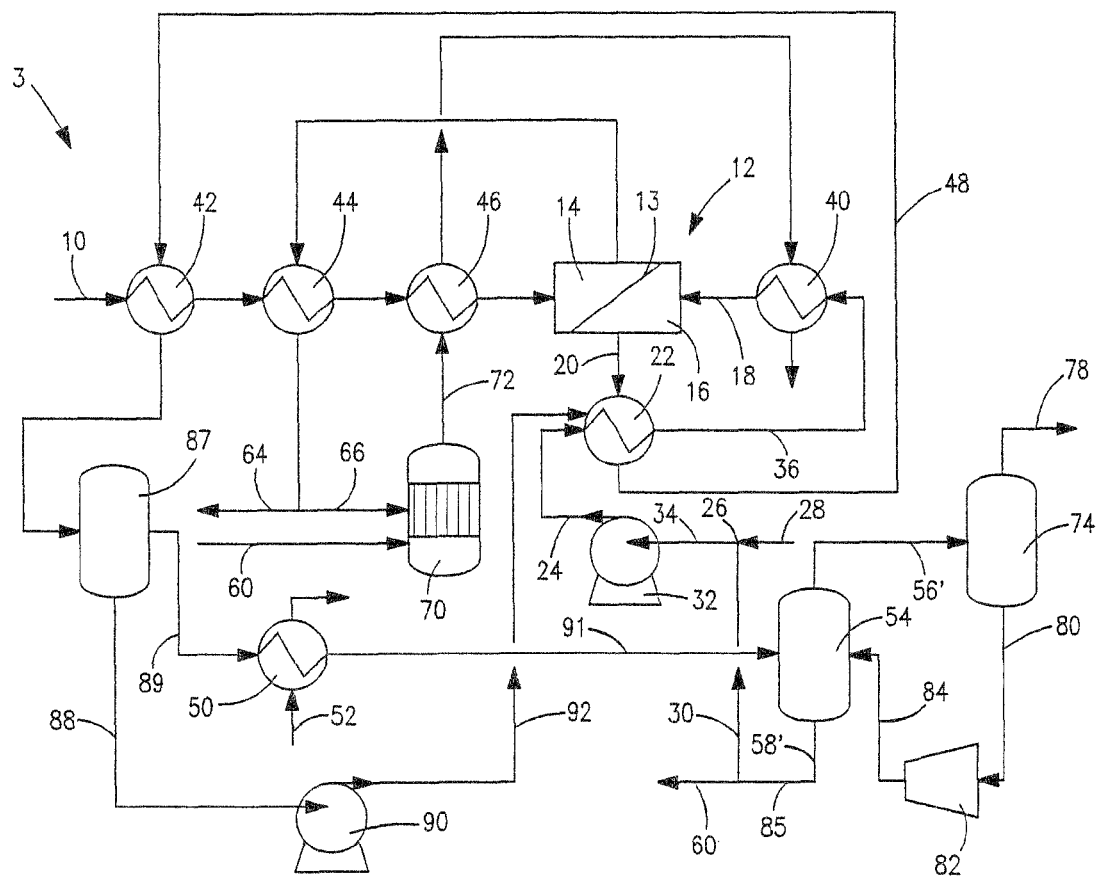
FIG. 3 is a schematic flow diagram of an alternative embodiment of FIG. 1.

With reference to FIG. 3, in a further alternative embodiment of apparatus 2, an apparatus 3 is illustrated in which a phase separator 87 is connected to the third heat exchanger 42 to produce a vapor phase stream 89 and a liquid phase stream 88 from two-phase stream 48 after having been cooled in third heat exchanger 42. Alternatively, a phase separator could also be connected to two-phase stream 48 before it is cooled in third heat exchanger 42. The water-cooled heat exchanger 50 is connected to the phase separator 87 to cool the resulting vapor phase stream 89 to form a two-phase stream 91. The phase separator 54 is connected to water-cooled heat exchanger 50 to receive the two-phase stream 91 and separate liquid contained in the two-phase stream 91 to form the component-rich stream 56' and the residual liquid stream 58'. As can be appreciated, the heat removed from liquid phase stream 88 is reduced, reducing the irreversible heat loss in heat exchanger 50, increasing the overall thermal efficiency of the process. The liquid phase stream 88 is pumped by a pump 90 to introduce a recycled sweep stream 92 into an intermediate location in the first heat exchanger 22 where it mixes with the liquid stream 24. Alternatively, first heat exchanger 22 can be separated into two separate heat exchangers and recycled sweep stream 92 can be mixed with liquid stream 24 between the two separate heat exchangers. Apparatus 3 otherwise functions in the same manner as apparatus 2 or apparatus 1 for that matter and for such purposes, the same reference numbers have been used with respect to elements thereof that have been described above with respect to apparatus 1 and apparatus 2.

Figure 4:
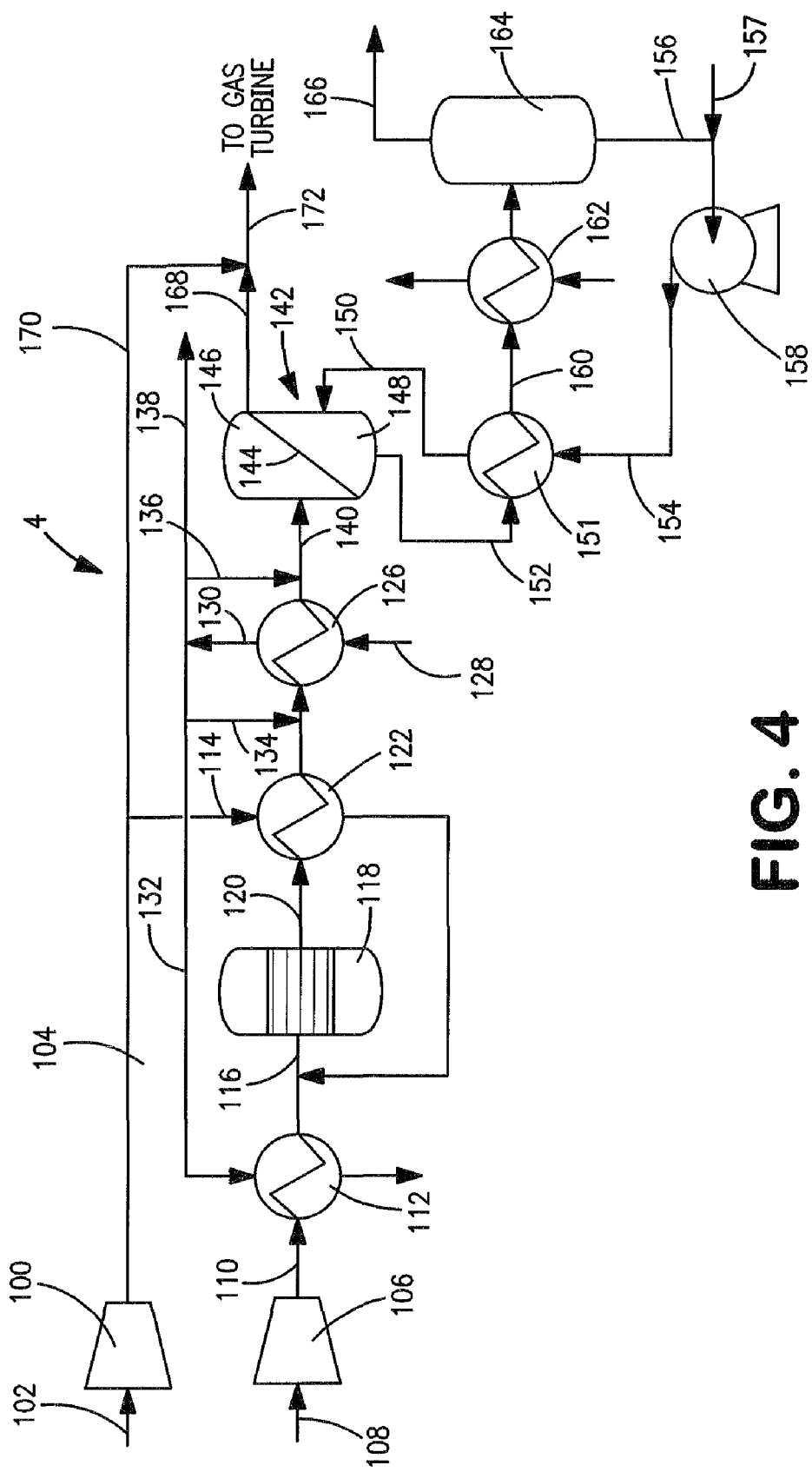
FIG. 4 is schematic flow diagram of another embodiment for carrying out a method in accordance with the present invention.

With additional reference to FIG. 4, a further alternative embodiment of the present invention is illustrated in which an apparatus 4 is shown that allows both for the production of hydrogen and a fuel for a gas turbine. When a high pressure retentate stream exists, it advantageously can be used in a gas turbine because the pressure energy stored in the pressurized waste gas can be used to produce power. It is likely that additional fuel will need to be fed to the gas turbine to increase the heating value of the turbine feed stream. This can be done easily by blending natural gas with the membrane retentate stream. In this regard, many gas turbines with low NOx combustors do not function properly with a fuel gas that contains a significant amount of hydrogen. One turbine manufacturer has stated that the hydrogen content of the fuel must be 10 percent or less.

Apparatus 4 is provided with a first compressor 100 to compress a natural gas stream 102 and thereby form a compressed natural gas stream 104. Additionally, a second compressor 106 is provided to compress an oxygen containing stream 108 and thereby form a compressed oxygen containing stream 110. A preheater 112 is connected to the second compressor 106 to preheat the compressed oxygen containing stream 110. A first subsidiary natural gas stream 114, after having been preheated and optionally compressed, is combined with the compressed oxygen containing stream 110 in a burner (not shown), after having been preheated, to form a reactant stream 116 that is introduced into a catalytic reactor 118 to form a synthesis gas stream 120. It is to be noted that a variety of catalytic reactors are possible including, but not limited to, steam reformers, oxygen based partial oxidation reactors, autothermal reformers, and oxygen transport membrane reactors. Synthesis gas stream 120 is then introduced into a second preheater 122 to indirectly exchange heat with the first subsidiary natural gas stream 114 for preheating purposes. This, however, is optional given the temperature of the synthesis gas stream, for example, steam could be used to heat stream 114 or second preheater 122 could be moved after the boiler 126. Optionally, a compressor can be provided to compress the first subsidiary natural gas stream 114 before being preheated in the first preheater 112. Optionally a compressor compresses the first subsidiary natural gas stream 114 before combination with the compressed oxygen containing stream 110 after having been preheated in the first preheater 112.

A boiler 126 is connected to the second preheater 122 to heat a boiler feed water stream 128 through indirect heat exchange with the synthesis gas stream 120 and thereby form a steam stream 130. A first part 132 of the steam stream 130 is introduced into the first preheater 112 to preheat the compressed oxygen containing stream 110. Optionally, a second part 134 of the steam stream 130 is introduced into the synthesis gas stream 120 prior to boiler 126 as a quench to help further cool the synthesis gas stream 120 and a third part 136 of the steam stream 130 is introduced into the synthesis gas stream after such stream is cooled in the boiler. It is to be noted that embodiments are possible in which either the second part 134 or the third part 136 of the steam stream 130 is eliminated. A fourth part 138 of the steam stream 130 can be exported. The resulting steam laden synthesis gas stream 140 is introduced into a membrane unit 142 that has a membrane 144 that also incorporates a water-gas shift catalyst in a known manner. When the steam laden synthesis gas stream 140 is introduced into a retentate side 146 of the membrane 144, the carbon monoxide contained in the synthesis gas stream will react with the steam in a known water-gas shift reaction to produce additional hydrogen that will be separated by the membrane, which can be a palladium alloy membrane, to produce hydrogen on a permeate side 148 of the membrane 144. In a similar manner as has been described with respect to the embodiments illustrated in FIGS. 1, 2 and 3, a sweep stream 150 is introduced into the permeate side 148 of the membrane 144 to produce a component laden sweep stream 152 that indirectly exchanges heat with a liquid stream 154 that constitutes the sweep stream in a liquid state in a heat exchanger 151 to produce the sweep stream 150. The sweep stream 154 is formed from a residual liquid stream 156 and a makeup stream 157 that is pumped by a pump 158 to form the sweep stream 154 in the liquid state. Pump 158 can pump the liquid to a supercritical pressure. In the case of a single component sweep stream, heating the sweep stream 154 in the liquid state by the component laden sweep stream 152 in the heat exchanger 151 together with the heat produced in the membrane unit 142 by virtue of the exothermic water-gas shift reactions will produce sweep stream 150 at a temperature that is no less than 100° F. below the supercritical temperature in the membrane unit 142. Sweep stream 150 can also be a multi-component mixture of higher and lower boiling components. In such case, component laden sweep stream 152 will be in a superheated vapor state due to heating within membrane unit 142. The materials referenced above would have equal applicability here.

As a result of the indirect heat exchange occurring within heat exchanger 151, the cooling of the component laden sweep stream 152 will produce a two-phase stream 160 that can be further cooled in a water-cooled heat exchanger 162 and then introduced into a phase separator 164 to separate liquid and vapor phases from the two-phase stream 160. The vapor phase is discharged from the phase separator 164 as a hydrogen product stream 166 and the liquid phase is discharged from phase separator 164 as the residual liquid stream 156. As in other embodiments the flow network would be provided with inlets for makeup and outlets such as have been described with reference to FIG. 1.

A retentate stream 168 produced in membrane unit 142 is combined with a second subsidiary natural gas stream 170 to produce a fuel stream 172 that can be used as a fuel to the gas turbine.

In a calculated example regarding the operation of the apparatus 4, natural gas stream 102 has a flow rate of 86,700 lb/hr (about 2 million scfh) and is compressed in compressor 100 to a pressure of 470 psig. About 75 percent, or 66,100 lb/hr, of this stream, as second subsidiary natural gas stream 170 goes directly to the gas turbine. The remaining 20,600 lb/hr of natural gas as subsidiary natural gas stream 114 is heated in preheater 122 to a temperature of about 1000° F. 1.14 million scfh of air as the oxygen containing stream 108 is compressed to 470 psig in compressor 106 and then heated in preheater 112 to 590° F. Boiler feed water stream 128 at a flow rate of 135,800 lb/hr is boiled in boiler 126 to produce steam stream 130. First part 132 of the steam stream 130 at a flow rate of 5,600 lb/hr is introduced into preheater 112. It is to be noted that the condensate can be recycled back as feed water within boiler feed water stream 128 to capture some of its heat. The remaining portions of the steam stream 130, designated by reference numbers 134 and 136 is injected into the synthesis gas stream 120 and exported as the fourth part of the steam stream 138 which in this example, is at a flow rate of 16,900 lb/hr.

The reactant stream 116 enters the catalytic reactor 118 at a temperature of 775° F. A higher preheat temperature reduces the amount of air necessary for the reactor and reduces the amount of combustion required to heat the reactor. In general, more preheat is desired, unless it requires changing the metallurgy of the heat exchangers and increasing their capital cost. The catalytic reactor, which may be an autothermal reformer, converts the natural gas and air into synthesis gas stream 120 having a flow rate of about 2.11 million scfh and a composition of 31 percent hydrogen, 16 percent carbon monoxide, 6 percent methane with the balance of mainly carbon dioxide, nitrogen and water. Synthesis gas stream 120 cools within heat exchanger 122 and mixes with 2,800 lb/hr of steam by way of the second part 134 of the steam stream 130 at 614° F. to cool the mixture to about 1400° F. before entering the boiler 126. The mixture exits the boiler at a temperature of about 440° F. and mixes with about 10,500 lb/hr of steam by way of the third part 136 of the steam stream 130 before entering the membrane unit 142 containing the water-gas shift catalyst. The shift reactor converts carbon monoxide and steam into carbon dioxide and hydrogen. The membrane unit 142 operates at a temperature of between about 600° F. and about 650° F. The membrane removes about 761,000 scfh of hydrogen using the sweep stream 150 in the supercritical state that is formed of supercritical octane having a flow rate of 2 million scfh, representing 85 percent hydrogen recovery. The component laden sweep stream 152, having a pressure of 600 psia, cools within heat exchanger 151 and most of the octane is condensed in water-cooled heat exchanger 162.

The retentate stream 168 has a flow rate of 1.6 million scfh, contains about 9 percent hydrogen and has a heating value of about 110 Btu/scf. The hydrogen concentration is low enough for a gas turbine combustion system to handle, but the heating value is too low. The retentate stream 168 is mixed with the second subsidiary natural gas stream 170 to increase the total flow to the gas turbine as fuel gas stream 172 to about 3.2 million scfh and increase the heating value to about 500 Btu/scf. The gas turbine burns this stream to produce 250 MW of power. Another way to increase the heating value of the retentate stream is to remove steam by condensation. This becomes more important when the ratio of retentate to natural gas in the fuel gas stream increases.

In an example of a commercially available system, 72,000 lb/hr of natural gas can be consumed in a gas turbine to produce 239 MW of net power. There is no hydrogen co-product and the overall capital cost is lower. In apparatus 4, the same turbine system is used to produce 250 MW of net power and 761,000 scfh of hydrogen using 86,700 lb/hr of natural gas. The additional equipment required to practice this process means that the capital cost is higher. Apparatus 4 consumes an additional 11,500 lb/hr of natural gas, but produces 761,000 scfh of hydrogen. This results in a hydrogen yield of 2.8 scf of hydrogen per scf of natural gas. This compares favorably to most large steam reformers, which are generally below 2.6 and often much lower in cases where export steam is produced.

Figure 5:
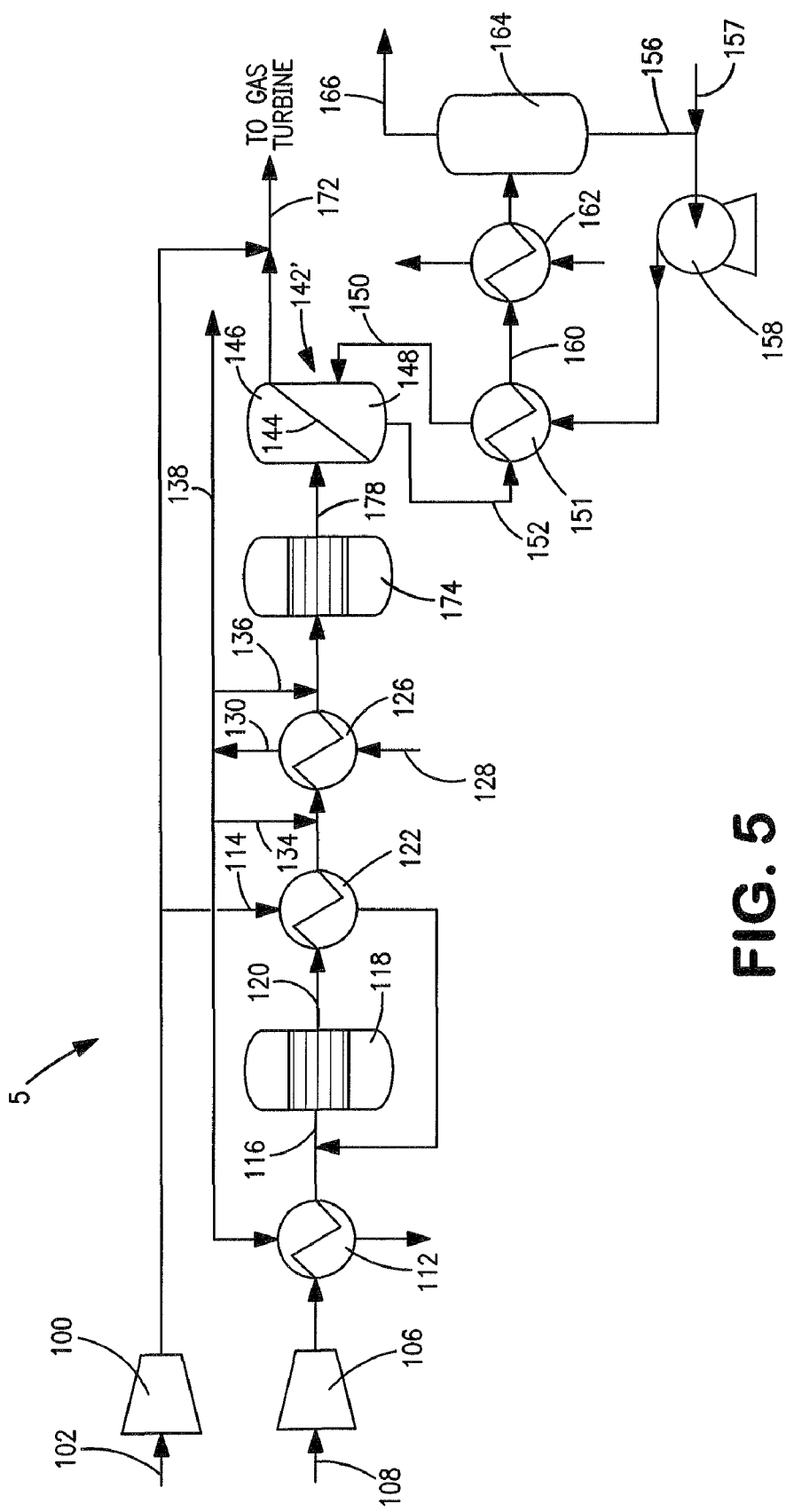
FIG. 5 is an alternative embodiment of FIG. 4.

With reference to FIG. 5, an alternative embodiment of FIG. 4 is illustrated as an apparatus 5 in which a separate water-gas shift reactor 174 is utilized in connection with a membrane unit 142' that does not therefore have a water-gas shift catalyst. In such embodiment, the steam laden synthesis gas stream is introduced into the water-gas shift reactor 174 to produce a shifted stream 178 that contains additional hydrogen by virtue of water-gas shift reactions between the carbon monoxide and the steam. The shifted stream is then introduced into the membrane unit 142' to separate the hydrogen from the shifted stream. The apparatus 5 otherwise functions in the same manner as the apparatus 4 and as such, the same reference numbers have been used in connection with the other elements of apparatus 4 that have been used in apparatus 5 having the same description.

The inlet hydrocarbon feed in apparatus 4 and 5 does not have to be natural gas. Other light hydrocarbons, liquids, or mixtures could also be used in the catalytic reactor 118. It is to be noted, however, that certain impurities associated with specific types of feeds, such as high levels of sulfur, are likely to cause problems with the membrane or catalysts, so they would need to be reduced to acceptable levels. However, other impurities, such as nitrogen or carbon dioxide, would pose no problem with operability, although they would affect the flow rates of the various streams.

Oxygen could be used instead of air for the catalytic reactor 118. This oxygen could be provided by VPSA because high purity would not be required. Alternatively, if available, oxygen produced by cryogenic distillation could also be used. Another possible way to obtain this oxygen would be to use a ceramic oxygen transport membrane operating at high temperature. The heat for the membrane could be produced by combustion for the turbine or oxidation reactions occurring in the catalytic reactor 118. The oxygen transport membrane could also be integrated into the catalytic reactor 118. This alternative would significantly increase the heating value of the synthesis gas stream 120, so less natural gas would be required for blending. The synthesis gas stream 120 would contain a higher fraction of hydrogen, so it would be possible to recover more hydrogen using the membrane. The use of an oxygen transport membrane, however, increases cost, and complexity.

There are many possible ways to make and use steam that is generated in apparatus 4 and apparatus 5. One possibility is to directly feed liquid water into the synthesis gas stream 120 after catalytic reactor 118 or after boiler 126. This will quench the synthesis gas and vaporize the water before it goes into the membrane unit 142' or the separate water-gas shift reactor 174.

Steam can be added either upstream or downstream of the boiler 126. Adding steam upstream reduces the inlet temperature to the heat exchanger, which could simplify the material requirements and reduce capital cost. The advantage of adding steam downstream is that more steam can be produced because the inlet temperature will be higher. Steam can also be fed into the catalytic reactor 118.

Excess steam as contained in fourth part 138 of the steam stream 130 can be used for other processes in the plant or fed directly to a steam turbine. The actual pressure and temperature of the export steam will determine the best place to add it. It is likely that both high pressure and low pressure steam could be exported and used in the steam turbine. Other uses for export steam will depend on the particular processes at a given location.

There are many possible ways to manage the heat in apparatus 4 or 5. The actual thermal management strategy will depend on the temperature, pressure, and amount of exported steam desired, the capital cost of the heat exchangers, and relative values of power, natural gas, and hydrogen.

It is also possible to separate the membranes into separate modules so that a single membrane module could be changed without shutting down the entire process. In this case, the power generation could continue by feeding more natural gas around the process. In addition to reduced complexity, another potential advantage of separating the membranes from the water-gas shift reactor is that the inlet hydrogen concentration to the membrane would be higher, so the flux would be higher, and the membrane area could be reduced. This is particularly important if the membrane is expensive and high hydrogen recovery is not critical.

It is possible to utilize a hydrogen membrane that is not a palladium alloy membrane especially in the case where the membrane is not integrated with the shift reactor. By separating the two processes, the membrane unit could operate at a cooler temperature. A sieving membrane is one example of a membrane that could operate at lower temperatures. In this case, the resulting shifted stream from the water-gas shift reactor such as water-gas shift reactor 174 would need to be heated or cooled, most likely using a heat exchanger (not shown). The composition of the retentate stream from such a membrane unit would depend on the performance of the membrane. The amount of natural gas required to be blended would of course depend on the retentate composition with the use of a sieving membrane. However, it is to be noted that molecular sieve membranes separate hydrogen based on molecular size. They are not as selective as palladium membranes and cannot produce high purity hydrogen. However, they are potentially more robust, particularly in harsh environments. For example, sulfur is known to poison palladium membranes, while molecular sieve membranes are more resistant to sulfur contamination. Furthermore, many applications do not require high purity hydrogen. A molecular sieve membrane would be particularly useful in harsh environments for applications that do not require high purity.

While the present invention has been described with reference to preferred embodiments, as will occur to those skilled in the art, numerous changes, additions and omissions can be made without departing from the spirit and scope of the invention as set forth in the appended claims.

What is claimed is:

1. A method of separating a component from a feed gas stream comprising:
    introducing the feed gas stream to a retentate side of a membrane and separating the component from the feed gas stream such that the component collects at a permeate side of the membrane by establishing a positive partial pressure difference of the component between the retentate side and the permeate side;
    circulating a sweep stream to the permeate side of the membrane to at least in part establish the positive partial pressure difference and thereby form a component laden sweep stream;
    the sweep stream being formed by pumping the sweep stream in a liquid state to a supercritical pressure and then heating the sweep stream to a temperature level of no less than 100° F. below a supercritical temperature;
    the sweep stream being heated, at least in part, through indirect heat exchange with the component laden sweep stream, thereby to cool the component laden sweep stream and to form a two-phase stream from the component laden sweep stream having the component in a vapor phase thereof;
    cooling the two-phase stream such that a liquid phase of the two-phase stream is enriched in a substance making up the sweep stream and a vapor phase thereof is enriched in the component;
    separating the vapor phase from the liquid phase to produce a component-rich stream containing the component and a residual liquid stream containing the substance; and
    recirculating the residual liquid stream as at least part of the makeup for the sweep stream in the liquid state.

2. A method of separating a component from a feed gas stream comprising:
    introducing the feed gas stream to a retentate side of a membrane and separating the component from the feed gas stream such that the component collects at a permeate side of the membrane by establishing a positive partial pressure difference of the component between the retentate side and the permeate side;
    circulating a sweep stream in a vapor state to the permeate side of the membrane to at least in part establish the positive partial pressure difference and thereby to form a component laden sweep stream, the sweep stream formed from a multi-component mixture containing at least one higher boiling component and at least one lower boiling component that are not formed by the component of the feed gas stream;
    the sweep stream in the vapor state formed by heating the sweep stream in a liquid state;
    the sweep stream being heated, at least in part, through indirect heat exchange with the component laden sweep stream, thereby to at least partially condense the at least one higher boiling component contained in the component laden sweep stream and thereby to form a two-phase stream from the component laden sweep stream having the component in a vapor phase thereof and to at least partially vaporize the at least one lower boiling component in the sweep stream in the liquid state;

cooling the two-phase stream such that a liquid phase of the two-phase stream is enriched in a substance making up the sweep stream and a vapor phase thereof is enriched in the component;
separating the vapor phase from the liquid phase to produce a component-rich stream containing the component and a residual liquid stream containing the substance; and
recirculating the residual liquid stream as at least part of the makeup for the sweep stream in the liquid state.

3. The method of claim 1 or claim 2, wherein the component is hydrogen.

4. The method of claim 3, wherein:
the component laden sweep stream indirectly exchanges heat to the sweep stream in the liquid state in a first heat exchanger and the sweep stream is further heated in a second heat exchanger prior to being introduced to the permeate side of the membrane;
the feed stream is heated in a third heat exchanger, a fourth heat exchanger and a fifth heat exchanger prior to being introduced to the retentate side of the membrane;
the two-phase stream is cooled by passing the two-phase stream in indirect heat exchange with the feed stream within the third heat exchanger and a water-cooled heat exchanger;
the vapor phase is separated from the liquid phase by passing the two-phase stream from the water-cooled heat exchanger to a phase separator;
a retentate stream is discharged from the retentate side of the membrane and is passed in indirect heat exchange with the feed stream in the fourth heat exchanger; and
a heated stream indirectly exchanges heat with the feed stream in the fifth heat exchanger and then indirectly exchanges heat with the sweep stream in the second heat exchanger.

5. The method of claim 3, wherein:
the component laden sweep stream indirectly exchanges heat to the sweep stream in the liquid state in a first heat exchanger and the sweep stream is further heated in a second heat exchanger prior to being introduced to the permeate side of the membrane;
the feed stream is heated in a third heat exchanger, a fourth heat exchanger and a fifth heat exchanger prior to being introduced to the retentate side of the membrane;
the two-phase stream is cooled by passing the two-phase stream in indirect heat exchange with the feed stream within the third heat exchanger and a water-cooled heat exchanger;
the two-phase stream is separated by passing the two-phase stream into a first phase separator, located between the third heat exchanger and the water-cooled heat exchanger, to form a vapor stream and a liquid stream, passing the vapor stream to the water-cooled heat exchanger and then to a second phase separator such that a portion of the vapor stream is condensed in the water-cooled heat exchanger and the residual liquid stream and the component-ich stream are formed in the second phase separator;
the liquid stream is recirculated and combined with the sweep stream in a liquid state to form another part of the makeup for the sweep stream in the liquid state;
a retentate stream is discharged from the retentate side of the membrane and is passed in indirect heat exchange with the feed stream in the fourth heat exchanger; and
a heated stream indirectly exchanges heat with the feed stream in the fifth heat exchanger and then indirectly exchanges heat with the sweep stream in the second heat exchanger.

6. The method of claim 3, wherein:
a natural gas stream is compressed to form a compressed natural gas stream;
an oxygen containing stream is compressed, preheated in a preheater and combined with a first subsidiary natural gas stream formed from part of the compressed natural gas stream that has been preheated, thereby to form a combined stream;
the combined stream is introduced into a catalytic reactor to form a synthesis gas stream;
the synthesis gas stream is introduced into a boiler to produce steam;
part of the steam passes in indirect heat exchange with the oxygen containing stream after having been compressed to preheat the oxygen containing stream, another part of the steam is introduced into the synthesis gas stream and a further part of the steam is exported;
carbon monoxide and the steam within the synthesis gas stream are subjected to a water-gas shift reaction to react carbon monoxide and the steam and thereby to produce additional hydrogen in a shifted stream;
the shifted stream is the feed stream; and
a second subsidiary natural gas stream formed from another part of the compressed natural gas stream is combined with the retentate stream to form a fuel stream to a gas turbine.

7. The method of claim 3, wherein:
a natural gas stream is compressed to form a compressed natural gas stream;
an oxygen containing stream is compressed, preheated in a preheater and combined with a first subsidiary natural as stream formed from part of the compressed natural gas stream that has been preheated, thereby to form a combined stream;
the combined stream is introduced into a catalytic reactor to form a synthesis gas stream;
the synthesis gas stream is introduced into a boiler to produce steam;
part of the steam passes in indirect heat exchange with the oxygen containing stream after having been compressed to preheat the oxygen containing stream, another part of the steam is introduced into the synthesis gas stream and a further part of the steam is exported;
the synthesis gas after the addition of the steam forms the feed stream;
the membrane is housed in a reactor containing a water-gas shift catalyst adjacent to or on the retentate side of the membrane, thereby to react the steam and carbon monoxide contained in the feed stream to produce additional hydrogen and carbon dioxide; and a second subsidiary natural gas stream formed from another part of the compressed natural gas stream is combined with the retentate stream to form a fuel stream to a gas turbine.

8. The method of claim 3, wherein:
the component-rich stream is introduced into a separation unit to separate the component from the component-rich stream and thereby to produce a further purified component-rich stream, further enriched in the component and a recovered stream comprising the substance;
the recovered stream is recirculated to a phase separator also used in separating the vapor phase from the liquid phase in the two-phase stream.

9. An apparatus for separating a component from a feed gas stream comprising:
a membrane unit having at least one membrane configured to receive the feed gas stream on a retentate side of the membrane and to separate the component from the feed gas stream such that the component collects at a permeate side of the membrane when a positive partial pressure difference of the component is established between the retentate side and the permeate side;

a flow network configured to circulate a sweep stream to the permeate side of the at least one membrane, thereby to at least in part establish the positive partial pressure difference and thereby form a component laden sweep stream;

a pump positioned within the flow network such that-the sweep stream in a liquid state is pumped to a supercritical pressure and to circulate the sweep stream to the least one membrane and the component laden sweep stream from the at least one membrane at the supercritical pressure;

heat exchangers positioned within the flow network and configured to indirectly exchange heat between the component laden sweep stream and the sweep stream in the liquid state, after having been pumped and while the sweep stream and the component laden sweep stream are at the supercritical pressure, such that the sweep stream is heated, at least in part, to a temperature level of no less than 100° F. below a supercritical temperature and the component laden sweep stream is cooled, thereby to form a two-phase stream from the component laden sweep stream having the component in a vapor phase thereof and to cool the two-phase stream such that a liquid phase of the two-phase stream is enriched in a substance making up the sweep stream and a vapor phase thereof is enriched in the component;

at least one phase separator positioned within the flow network to receive the two-phase stream after having been cooled, thereby to separate the vapor phase from the liquid phase and to produce a component-rich stream containing the component and a residual liquid stream;

the pump connected to the at least one phase separator such that at least the residual liquid stream is pumped by the pump to the supercritical pressure and the residual liquid stream therefore, forms at least part of a makeup for the sweep stream in the liquid state and the pump also connected to one heat exchanger of the heat exchangers; and the one heat exchanger connected to the permeate side of the at least one membrane such that the component laden sweep stream is directly introduced from the at least one membrane to the one heat exchanger and the indirect heat exchange between the sweep stream in the liquid state and the component laden sweep stream occurs within the one heat exchanger and thereby forms the two-phase stream.

10. An apparatus for separating a component from a feed gas stream comprising:

a membrane unit having at least one membrane configured to receive the feed gas stream on a retentate side of the membrane and to separate the component from the feed gas stream such that the component collects at a permeate side of the membrane when a positive partial pressure difference of the component is established between the retentate side and the permeate side;

a flow network configured to circulate a sweep stream in a vapor state to the permeate side of the membrane, thereby to at least in part establish the positive partial pressure difference and thereby form a component laden sweep stream;

the sweep stream formed from a substance composed of a multi-component mixture containing at least one higher boiling component and at least one lower boiling component that are not formed by the component of the feed gas stream;

a pump positioned within the flow network such that the sweep stream in a liquid state is pressurized;

heat exchangers positioned within the flow network and configured to indirectly exchange heat between the component laden sweep stream and the sweep stream in the liquid state, after having been pumped, such that at least the at least one lower boiling component contained in the sweep stream in the liquid state is at least partially vaporized and the at least one higher boiling component in the component laden sweep stream is at least partially condensed, thereby to form a two-phase stream from the component laden sweep stream having the component in a vapor phase thereof and to cool the two-phase stream such that a liquid phase of the two-phase stream is enriched in the substance making up the sweep stream and a vapor phase thereof is enriched in the component;

at least one phase separator positioned within the flow network to receive the two-phase stream after having been cooled, thereby to separate the vapor phase from the liquid phase and to produce a component-rich stream containing the component and the residual liquid stream;

the pump connected to the at least one phase separator such that at least the residual liquid stream is pumped by the pump and the residual liquid stream therefore, forms at least part of a makeup for the sweep stream in the liquid state and the pump also connected to one heat exchanger of the heat exchangers; and the one heat exchanger connected to the permeate side of the at least one membrane such that the component laden sweep stream is directly introduced from the at least one membrane to the one heat exchanger and the indirect heat exchange between the sweep stream in the liquid state and the component laden sweep stream occurs within the one heat exchanger and thereby forms the two-phase stream.

11. The apparatus of claim 9 or claim 10, wherein the component is hydrogen.

12. The apparatus of claim 11, wherein:

the heat exchangers include a first heat exchanger, a second heat exchanger, a third heat exchanger, a fourth heat exchanger, a fifth heat exchanger and a water-cooled heat exchanger;

the first heat exchanger is the one heat exchanger;

the second heat exchanger communicates between the first heat exchanger and the permeate side of the at least one membrane and connected to the fifth heat exchanger such that a heated stream passing through and discharged from the fifth heat exchanger further heats the sweep stream within the second heat exchanger;

the third heat exchanger is configured to receive the feed stream and the third heat exchanger, the fourth heat exchanger and the fifth heat exchanger are serially connected such that the feed stream is successively heated in the third heat exchanger, the fourth heat exchanger and the fifth heat exchanger is in flow communication with a retentate side of the at least one membrane such that the feed stream after having been heated is introduced to the retentate side of the at least one membrane and a retentate stream is discharged therefrom;

the third heat exchanger is connected to the first heat exchanger such that the two-phase stream is cooled by the feed stream;

the fourth heat exchanger is in flow communication with the retentate side of the at least one membrane such that the retentate stream further heats the feed stream;

the water-cooled heat exchanger is connected to the third heat exchanger so that the two-phase stream is further cooled within the water-cooled heat exchanger; and the at least one phase separator is a single phase separator connected to the water-cooled heat exchanger to receive the two-phase stream.

13. The apparatus of claim 11, wherein:

the heat exchangers include a first heat exchanger, a second heat exchanger, a third heat exchanger, a fourth heat exchanger, a fifth heat exchanger and a water-cooled heat exchanger;

the first heat exchanger is the one heat exchanger;

the second heat exchanger communicates between the first heat exchanger and the permeate side of the at least one membrane and is connected to the fifth heat exchanger such that a heated stream passing through and discharged from the fifth heat exchanger further heats the sweep stream;

the third heat exchanger is configured to receive the feed stream, the third heat exchanger, the fourth heat exchanger and the fifth heat exchanger are serially connected such that the feed stream is successively heated in the third heat exchanger, the fourth heat exchanger and the fifth heat exchanger is in flow communication with the retentate side of the at least one membrane such that the feed stream after having been heated is introduced to the retentate side of the at least one membrane and a retentate is discharged therefrom;

the third heat exchanger is connected to the first heat exchanger such that the two-phase stream is cooled by the feed stream;

the fourth heat exchanger is in flow communication with the retentate side of the at least one membrane such that the retentate stream further heats the feed stream;

the at least one phase separator is a first phase separator and a second phase separator;

the second phase separator is connected to the water-cooled heat exchanger;

the first phase separator is connected between the water-cooled heat exchanger and the third heat exchanger such that a vapor stream and a liquid stream are formed in the first phase separator, the vapor stream passes to the water-cooled heat exchanger such that a portion of the vapor stream is condensed and the residual liquid stream and the component-rich stream are formed in the second phase separator;

another pump is connected to the first phase separator and between the first heat exchanger and the second heat exchanger such that the liquid stream combines with the sweep stream between the first heat exchanger and the second heat exchanger.

14. The apparatus of claim 11, further comprising:

a first compressor to compress a natural gas stream and thereby form a compressed natural gas stream;

a second compressor to compress an oxygen containing stream;

preheaters positioned so as to preheat the oxygen containing stream and a first subsidiary natural gas stream formed from part of the natural gas stream after having been compressed;

a catalytic reactor in flow communication with the preheaters such that a combined stream, composed of a first subsidiary natural gas stream and the oxygen containing stream, is introduced into a catalytic reactor to form a synthesis gas stream;

a boiler configured to receive the synthesis gas stream to heat boiler feed water and thereby to produce steam;

the boiler connected to the preheater such that part of the steam passes in indirect heat exchange with the oxygen containing stream after having been compressed to preheat the oxygen containing stream;

a water-gas shift reactor connected to the boiler such that another part of the steam is introduced into the synthesis gas stream and carbon monoxide within the synthesis gas stream and the steam are subjected to a water-gas shift reaction within the water-gas shift reactor to react carbon monoxide and the steam and thereby to produce a shifted stream containing additional hydrogen;

an outlet to discharge a further part of the steam from the boiler; and the membrane unit is connected to the water-gas shift reactor such that the shifted stream is introduced to the retentate side of the membrane as the feed stream and is also in flow communication with the first compressor such that a second subsidiary natural gas stream formed from another part of the compressed natural gas stream combines with the retentate stream to form a fuel stream to a gas turbine.

15. The apparatus of claim 11, wherein:

a first compressor to compress a natural gas stream and thereby form a compressed natural gas stream;

a second compressor to compress an oxygen containing stream;

preheaters positioned so as to preheat the oxygen containing stream and a first subsidiary natural gas stream formed from part of the natural gas stream after having been compressed;

a catalytic reactor in flow communication with the preheaters such that a combined stream, composed of a first subsidiary natural gas stream and the oxygen containing stream, is introduced into a catalytic reactor to form a synthesis gas stream;

a boiler configured to receive the synthesis gas stream to heat boiler feed water and thereby to produce steam;

the boiler connected to the preheater such that part of the steam passes in indirect heat exchange with the oxygen containing stream after having been compressed to preheat the oxygen containing stream;

the membrane unit is connected to the boiler so that another part of the steam and the synthesis gas stream combine and are introduced to the retentate side of the membrane as the feed stream;

the membrane unit contains a water-gas shift catalyst adjacent to or on the retentate side of the membrane, thereby to react the steam and carbon monoxide contained in the synthesis gas stream to produce additional hydrogen;

an outlet discharges a further part of the steam from the boiler; and the membrane unit is also in flow communication with the first compressor such that a second subsidiary natural gas stream formed from another part of the compressed natural gas stream combines with the retentate stream to form a fuel stream to a gas turbine.

16. The apparatus of claim 12, further comprising:

a separation unit connected to the at least one phase separator so as to receive the component-rich stream and configured to separate the hydrogen from the component-rich stream and thereby to produce a further purified component-rich stream, further enriched in the hydrogen and a recovered stream comprising the substance;

the flow network configured such that the recovered stream is recirculated to the single phase separator.

17. The apparatus of claim 13, further comprising:

a separation unit connected to the at least one phase separator so as to receive the component-rich stream and configured to separate the hydrogen from the component-rich stream and thereby to produce a further purified component-rich stream, further enriched in the hydrogen and a recovered stream comprising the substance; and the flow network configured such that the recovered stream is recirculated to the second phase separator.

* * * * *